United States Patent

Haake et al.

[11] Patent Number: 5,942,966
[45] Date of Patent: Aug. 24, 1999

[54] CLOSING-EDGE-TYPE FUSE

[76] Inventors: André Haake; Oliver Haake; Patrick Haake, all of Eschlohn 24, Südlohn D-46354, Germany

[21] Appl. No.: 09/142,446
[22] PCT Filed: Mar. 14, 1997
[86] PCT No.: PCT/DE97/00535
 § 371 Date: Sep. 2, 1998
 § 102(e) Date: Sep. 2, 1998
[87] PCT Pub. No.: WO97/38199
 PCT Pub. Date: Oct. 16, 1997

[30] Foreign Application Priority Data

Apr. 4, 1996 [DE] Germany ............ 196 13 436

[51] Int. Cl.⁶ ............... H01H 85/00; H01H 3/16
[52] U.S. Cl. ............... 337/4; 200/61.43; 200/86 R
[58] Field of Search ............... 337/1–6; 200/61.43, 200/61.42, 85 R, 86 R, 86 A; 340/655, 666

[56] References Cited

U.S. PATENT DOCUMENTS

| 3,315,050 | 4/1967 | Miller | 200/61.43 |
| 3,693,026 | 9/1972 | Miller | 307/119 |
| 4,115,952 | 9/1978 | French | 49/26 |
| 4,396,814 | 8/1983 | Miller | 200/61.43 |
| 4,785,143 | 11/1988 | Miller | 200/61.43 |
| 4,920,241 | 4/1990 | Miller | 200/86 R |
| 5,066,835 | 11/1991 | Miller et al. | 200/61.43 |

FOREIGN PATENT DOCUMENTS

| 0 103 726 | 3/1984 | European Pat. Off. |
| 0 234 523 | 11/1989 | European Pat. Off. |
| 29 17 797 | 11/1980 | Germany |
| 38 43 478 C1 | 2/1990 | Germany |

Primary Examiner—Leo P. Picard
Assistant Examiner—Anatoly Vortman
Attorney, Agent, or Firm—Merchant, Gould, Smith, Edell, Welter & Schmidt

[57] ABSTRACT

The invention concerns a closing-edge-type fuse with a safety strip (1) which comprises an electric switch device and consists of a plurality of contact elements (2, 2a) which are disposed in a row in a resilient tube (3). In the rest position, under the effect of resilient prestress, the contact elements (2, 2a) abut one another at contact points provided at the end face. Under the effect of an external force when the tube (3) is deformed, the contact elements (2, 2a) are moved apart breaking the contact. A resilient contact element bed (4, 4a), which is adapted to the shape of the contact elements (2, 2a) and accommodates each of the contact elements individually, is provided in the resilient tube (3).

7 Claims, 1 Drawing Sheet

CLOSING-EDGE-TYPE FUSE

The invention relates to a closing-edge fuse in accordance with the preamble of the main claim.

A closing-edge arrangement of the generic type is described in EP 234 523 B1. In this known arrangement, tapered insulating rings or annular insulating members are provided between the contact elements, causing the contact elements, which comprise insulating member and electrically conductive contact point, to be separated when even a minimal pressure is applied to these insulating bodies, hence triggering the switching operation. The known arrangement is extremely sensitive, and has therefore proven exceptionally effective in operation; however, it has the drawback that it is expensive to produce. Also, the use of the wedge elements between the contact elements requires a relatively large structural size, and providing the wedge elements limits the geometric configuration of the switching strip, since sharp-edged corners could themselves trigger a switching operation.

It is known from EP 01 03 726 A1 to design the contact elements as current-carrying pins with rounded ends, which pins are embedded in an insulating plastic material, the ends of the pins protruding beyond the plastic bodies. The plastic bodies are arranged in a resilient tube, but there is no contact element bed formed in this tube, but rather these plastic bodies are able to move freely in the tube.

The invention is based on the object of improving the arrangement of the generic type so that it can be produced more cost-effectively, allows small structural sines and such that the switching strip can be used to cover any desired geometric shape.

This object underlying the invention is achieved by the teaching of the main claim.

Advantageous refinements are explained in the sub-claims.

In other words, what is proposed is a closing-edge fuse which comprises a chain of contacts and the accommodating medium, e.g. a rubber profile. The chain of contacts is constructed in such a way that it comprises spherical or roller like elements. These elements are mounted in a bed formed in the accommodating medium, a so-called contact element bed. This configuration avoids the separate tapered roll or tapered ring which has hitherto been required, this contact element bed being able to accommodate or surround the contact element over only half the side. This contact element bed is of resilient design and is on the side to which force is applied.

It is possible here, as in the prior art, for the individual contact elements to be connected to one another by an expander cord or, in accordance with DE 29 17 797 A1, by a wire-spring arrangement, and hence to be preloaded.

With this arrangement according to the invention, the switching is carried out by the fact that the balls, on the one hand, are incorporated in a fixed position in the ball bed and, on the other hand, that the bending radius in the centre axis of the chain of contacts formed by the contact elements is greater than the bending radius of the actual contact element bed. This results in different distances to produce contact separation. Furthermore, however, the switching in this new configuration is carried out as in the previously known design, i.e. when pressure is applied the resilient design of the ball bed creates axial force components which are distributed in all directions.

It is clear that the arrangement according to the invention results in a very small structural design and that the configuration of the closing-edge fuse is inexpensive, since the additionally required structural elements, namely the tapered roll etc., can be dispensed with. Balls are a mass-produced item which can be procured at low cost, and at the same time a very sensitive switch is achieved, since even very slight bending is sufficient to trigger the switching operation.

Furthermore, a very significant advantage of the arrangement according to the invention is that this design can be used to produce any desired geometric arrangement, i.e. closing-edge fuses with narrow radii, moulded parts, window gaskets, manual switches, etc. The adjustable preloading of the expander cords allows unevenness, vibrations, etc. to be compensated for.

Exemplary embodiments of the invention are explained below with reference to the drawings, in which.

Figure 4:
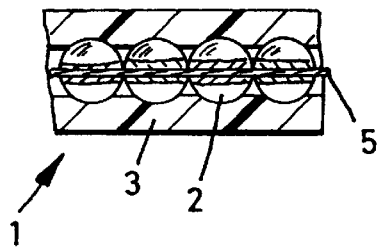
FIG. 4 shows the arrangement of a rotationally symmetrical contact element bed, FIG. 5 snows the arrangement of a half-side contact element bed.
Figure 5:
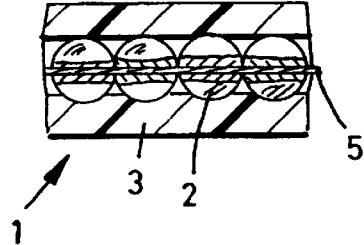
Figure 6:
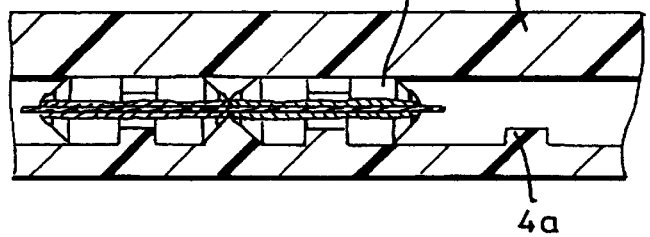
FIG. 6 shows an arrangement with modified contact elements.

In the drawings, 1 denotes a safety strip, which comprises a tube 3 in which contact elements 2 and 2a are arranged, which contact elements, in the embodiments in accordance with FIGS. 1 to 5, are designed as balls and, in the embodiment in accordance with FIG. 6, are designed as rollers, which preferably have hemispherical end sides.

Figure 1:
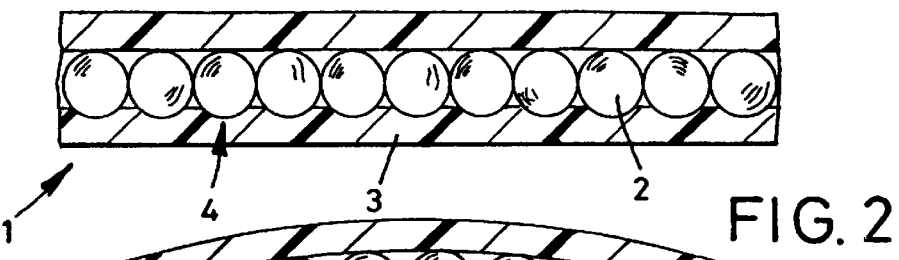
FIG. 1 shows a first embodiment without expander cord.

In the arrangement in accordance with FIG. 1, it can be seen that the balls 2 lie in contact element beds, which are adapted to the shape of the ball and can be produced, for example, during the production of the tube. However, it is equally possible to foam the tube, thus embedding the balls in corresponding beds. As FIGS. 4 and 5 show, the beds may surround the ball 2 in a rotationally symmetrical manner, but may also be formed only on one side of the tube. If the contact element beds are provided only on one side of the tube, the bed must be formed on that side of the tube to which pressure is applied.

Figure 2:
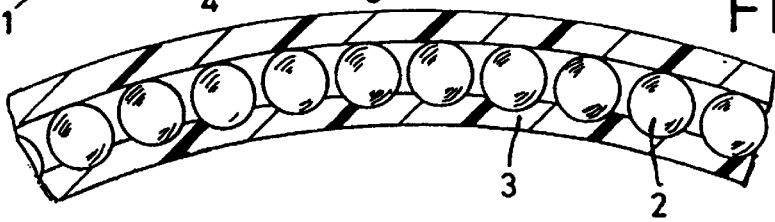
FIG. 2 shows an arrangement for illustrating the switching operation.

FIG. 2 illustrates that the bending radius in the centre axis of the tube, running through the centre of the contact elements 2, is greater than the bending radius of the actual bed, so that different distances are produced leading to contact separation. Thus the separation is here carried out in accordance with the principle of deflection.

However, the separation is furthermore based on the fact that the contact elements are integrated in a fixed position in the beds, and are thus pulled apart from one another when the switching strip bends.

Figure 3:
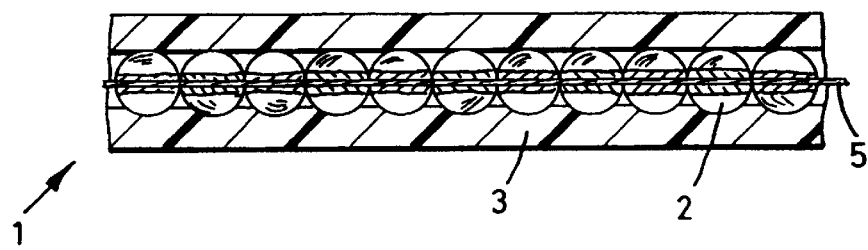
FIG. 3 shows an arrangement in accordance with FIG. 1, but with an expander cord.

FIG. 3 shows the arrangement in accordance with FIG. 1 with the addition of an expander cord 5, with the result that the contact elements 2 are now drawn towards one another, so that unevenness, vibrations, etc., cannot lead to switching of the arrangement.

The embodiment in accordance with FIG. 6 shows how the spherical heads of roller-like contact elements 2a bear against one another and how the contact elements are incorporated fixedly in the switching strip la by the fact that the contact element beds 4a are produced by projections which engage in corresponding recesses in the roller-like contact elements. This embodiment too may be constructed with or without expander cord.

We claim:

1. Closing-edge fuse with a safety strip (1), which has an electric switch device and comprises a plurality of contact elements (2, 2a) which are arranged in a row in a resilient tube (3), the contact elements (2, 2a) bearing against one another in the rest position at contact points provided on the end sides under the effect of resilient preloading and, under the effect of an external force when the tube (3) is deformed, being moved apart so as to break the contact, wherein a resilient contact element bed (4, 4a) is formed in the resilient tube (3), said contact element bed is adapted to the shape of the contact elements (2, 2a), accommodates each of the contact elements individually and is arranged in a fixed position with respect to the tube (3) and on that side of the tube (3) to which force is applied.

2. Closing-edge fuse according to claim 1, wherein the contact element bed (4, 4a) is provided in the tube over only half the side of the tube (3).

3. Closing-edge fuse according to claim 1, characterized in that the contact element bed (4, 4a) is provided over the entire inner circumference of the tube.

4. Closing-edge fuse according to one of the preceding claims, wherein an expander cord (5) passes through the contact elements (2, 2a).

5. Closing-edge fuse according to claims 1 to 3, wherein a wire-spring arrangement passes through the contact elements (2, 2a).

6. Closing-edge fuse according to one of the preceding claims, wherein the contact elements (2) are designed as balls.

7. Closing-edge fuse according to one of the preceding claims 1 to 5, wherein the contact elements (2a) are of roller-like design and are of hemispherical configuration at their end sides.

* * * * *